Oct. 16, 1951 C. W. BLOSSEY ET AL 2,571,411

TURRET AND TREADLE BAR TUNER

Filed June 6, 1946 3 Sheets-Sheet 1

Inventors
Carl W. Blossey &
Manfred G. Wright
By [signature]
Attorneys

Oct. 16, 1951 C. W. BLOSSEY ET AL 2,571,411

TURRET AND TREADLE BAR TUNER

Filed June 6, 1946 3 Sheets-Sheet 2

Inventors
Carl W. Blossey &
Manfred G. Wright
By Blackmore, Spencer & Flint
Attorneys Oct. 16, 1951 C. W. BLOSSEY ET AL 2,571,411

TURRET AND TREADLE BAR TUNER

Filed June 6, 1946 3 Sheets-Sheet 3

Inventors
Carl W. Blossey &
Manfred G. Wright
By Blackmore, Spencer & Flint
Attorneys Patented Oct. 16, 1951 2,571,411

UNITED STATES PATENT OFFICE 2,571,411

TURRET AND TREADLE BAR TUNER

Carl W. Blossey and Manfred G. Wright, Kokomo, Ind., assignors to General Motors Corporation, Detroit, Mich., a corporation of Delaware Application June 6, 1946, Serial No. 674,832

15 Claims. (Cl. 74—10.15)

This application relates to manual or automatic indexing mechanism, and more particularly to mechanisms for tuning a radio receiver to a number of preselected stations, in sequence.

Radio receivers, especially those used in automobiles, must be capable of operation with a minimum of effort by the listener. A step in this direction is push button tuning in which a number of push buttons or levers, are available for selectively tuning the radio receiver to a desired station. By pushing one of these buttons or levers the various tuning elements of the receiver are forced into positions predetermined as being correct for station desired. By pushing another button the radio receiver is tuned to a second station. Thus by use of these push button assemblies, the operator of the set may select, and tune in any one of four or five preset broadcasting stations.

Selective push button tuning, although possessing a number of advantages over dial tuning, still leaves something to be desired, particularly in automobile radios.

Push button tuners, by their very nature, must be located on or very near the radio cabinet, and the operator must visually select the button or lever he is to actuate.

In automobiles, the radio is usually located on or near the instrument panel. This is out of the normal field of view of the driver, and remote from the steering wheel and the driver's normal position. A great need, therefore, arises for a tuning means which may be operated remotely and which requires no visual selection of the mechanism to be actuated. It is also very desirable that some means be provided for conveniently altering the stations preselected when the owner desires to change the combination of stations to be received.

It is therefore an object of this invention to provide an indexing device of improved design.

Another object of this invention is to provide an improved radio tuning device of the step by step type.

A further object of this invention is to provide a tuning device for radio receiving apparatus which is simple in construction, inexpensive in cost, dependable in operation and of a size adapted to be positioned within a relatively restricted space.

Another object of this invention is to provide a sequential tuning device which may be manually or electrically operated.

A still further object of this invention is to provide a sequential tuning device for permeability tuned radio sets.

With these and other objects in view, the embodiment of our invention will best be understood by reference to the following specification and claims and the illustrations in the following drawings, in which:

Figures 1, 2:
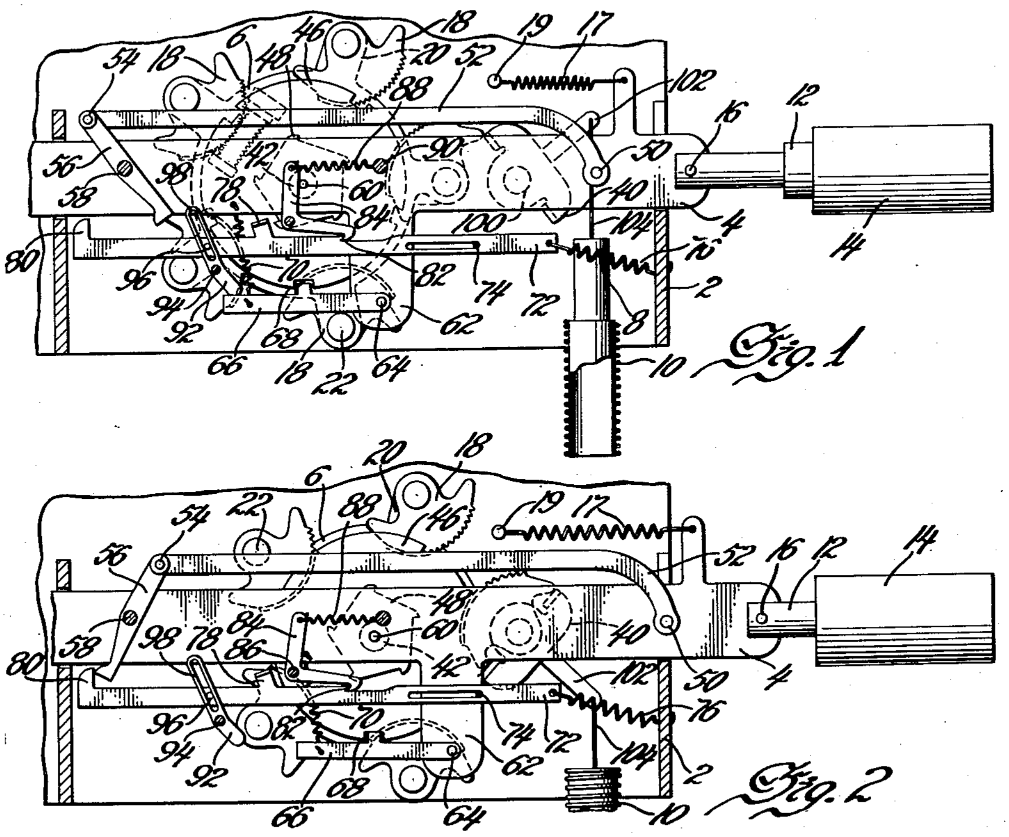
Figure 1 is a view of one embodiment of our invention with the actuating linkage in the retracted position before indexing of the turret.
Figure 2 is a view of the same embodiment of our invention as Figure 1 with the actuating linkage in the position assumed when the radio set is tuned.
Figure 3:
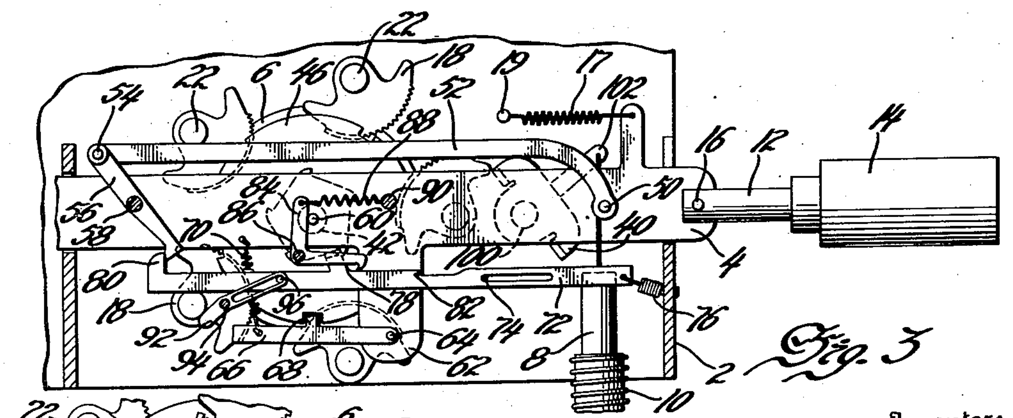
Figure 3 is a view of the same embodiment of our invention as Figures 1 and 2 but showing the actuating linkage in the retracted position after the indexing of the turret.

Referring now more specifically to Figures 1, 2 and 3: A frame 2 supports a slide 4 carrying a turret plate 6 which, through suitable linkages, adjusts the core 8 in a coil 10 to tune a radio set. This figure shows an actuating solenoid core 12 in an electromagnetic coil 14 attached to a slide 4 by a pin 16. The slide is biased to the left by tension spring 17, which in turn is attached to frame 2 by pin 19.

Manual actuating means, however, may be substituted for this electromagnetic means or capacitance tuning means may be attached to the treadle bar 40 instead of the inductance tuning means illustrated, without departing from the scope of our invention.

Slide 4 has rotatably attached thereto, by means of shaft 42, a turret plate 6 carrying adjustable tuning cams 18 equidistantly arcuately spaced thereon. This index plate and cam arrangement is shown in greater detail in Figure 4 and will be more specifically described later in this application. Rigidly secured to turret plate 6 and rotatable therewith is index plate 46 and index cam 48. Pivotally mounted on slide 4 by means of pin 50 is a connecting link 52. This link has, in turn, pivotally mounted thereon by pin 54, a lever 56 which is rotatably secured to the frame 2 by another pin 58. Slide 4 has also mounted thereon, a projection 60 for tripping the indexing mechanism. This projection is shown as being concentric with the plate 6 but such location is not necessary as any other suitable location is sufficient. Pivotally mounted on projection 62 of slide 4 by means of a pin 64 is a latching lever 66. A projection on lever 66, is biased into engagement with a steep sided detent 68, on index plate 46, by means of spring 70. The spring is secured at the end opposite the latching lever to the slide 4.

Ratchet slide 72 is supported by and free to slide on pin 74 which is rigidly secured to part of the frame 2. Tension spring 76 is fastened to the frame 2 and loads the slide 72 toward the frame where the spring is attached. Slide 72 carries a ratchet pawl 78 so positioned as to properly engage the projections on the index cam 48. On one end of slide 72 is a projection 80 of suitable size and configuration to be properly engaged by lever 56 and so retract this slide sufficiently for the bellcrank lever 84 to engage notch 82. Lever 84 is pivotally mounted to frame 2 on pin 86. It is biased in a clockwise direction by tension spring 88 attached to frame 2 by pin 90. This lever is located so as to be rotated counterclockwise against the bias of spring 88 by pin 60 when slide 4 is moved sufficiently to the left. Lever 92 is pivotally mounted to frame 2 on pin 94 and slidably connected to slide 72 by pin 96 which is fixed to the slide and slides in slot 98 in the lever. The lower edge of this lever is so formed as to be capable of contacting latching lever 66 and rotating it sufficiently to disengage a projection on this latching lever from detent 68 on index plate 46.

Tuning treadle bar 40 is rotatably attached to frame 2 by pin 100. Secured to projection 102 of the treadle bar is a cable 104 for moving tuning core 8 into its proper position in inductance coil 10.

Figure 4:
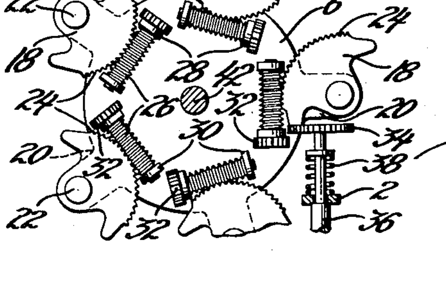
Figure 4 shows the turret subassembly illustrating the means for altering the station setups.

Fig. 4 is a more detailed view of the turret plate 6 and the means for mounting and adjusting the pivotally mounted double contact tuning cams 18. In the specific form of our invention shown, the plate 6 has five circumferentially equally spaced projections 20. Mounted on these projections by means of pins 22 are cams 18 having two projecting cam surfaces. Concentric with the mounting pins these cams have worm gear teeth or threads 24. Engaging said gear teeth, for the purpose of resetting and holding in the reset position, are worms or threaded adjusting means 26. These worms are secured to the turret plate 6 by bearing brackets 28 and 30 and have mounted on one end thereof a spur gear 32. Mounted on the frame 2 is a reset shaft 36 with a spur gear 34 which is capable of being engaged with spur gear 32 when the cam adjusted by that gear is engaged with the tuning treadle bar 40. The gears are normally held disengaged, even when the two contact surfaces of cam 18 are engaged with the treadle bar 40, by coil spring 38, but may be engaged by manually retracting the shaft 36. Thus, by retracting shaft 36 to engage the gears and rotating it, any radio station, within the frequency range covered by the set, may be selected and the correct tuning adjustment therefore set on the tuning device.

Figure 5:
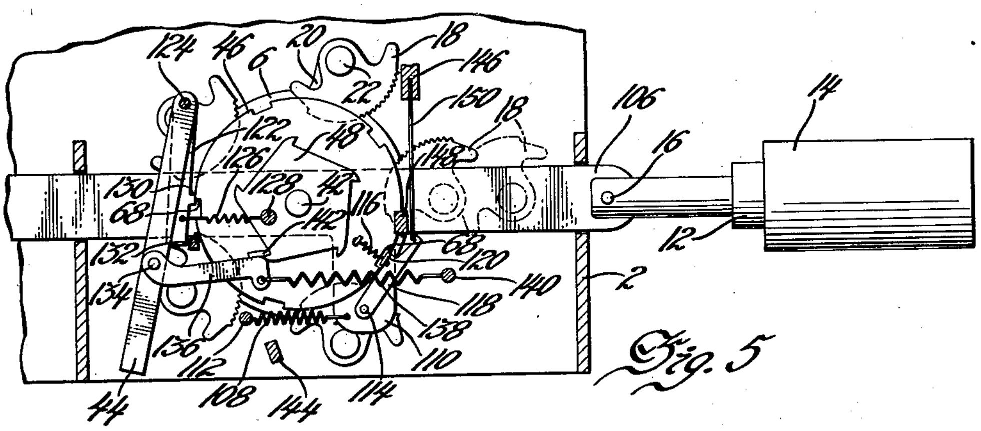
Figure 5 shows a second embodiment of our invention.

Referring to Figure 5, another form of our invention is shown. In this form the indexing mechanism includes an oscillating lever 44 instead of a sliding member as shown in Figures 1 to 3. In this embodiment of our invention the slide 106 carries the turret plate assembly in a manner similar to slide 4 of the form shown in Figures 1 to 3. Slide 106 is biased to the left by a tension spring 108, attached at one end to a projection 110 of the slide, and at the other end to a pin 112 rigidly attached to the frame 2. Attached to projection 110 by means of pivot pin 114, and spring 116, is latching lever 118, which has a projection 120 for engaging detent 68 of the index plate 46. Lever 122 which is rotatably secured to frame 2 by pin 124 is biased in counterclockwise direction by tension spring 126 which is attached to frame 2 by pin 128. Lever 122 has a projection 130 for engaging detents 68. Projections 120 and 130 are so spaced angularly with respect to index plate 46 that both of them cannot engage detents therein simultaneously. Projection 132 on frame 2 is so positioned as to limit the movement of, and engage lever 122 at the proper time to raise the projection 130 out of the detents 68 and permit indexing of the turret plate 6. Lever 44 is also rotatably mounted to frame 2 by pin 124.

Rotatably mounted on lever 44 by means of pin 134 is a ratchet lever 136. This ratchet lever is maintained in the proper position with regard to index cam 48 by a tension spring 138. The other end of this spring is attached to the frame 2 by means of a pin 140.

Also located on lever 136 is a projection 142 for engaging index cam 48 and indexing the turret plate 6. Spring 138 also performs a second function of biasing the lever 44 in a counterclockwise direction. Its rotation in this direction is limited by projection 144 on frame 2. Also mounted on frame 2 are two projections or lugs 146 and 148. Lug 146 has attached thereto a leaf spring 150, which is free to flex in one direction but is restrained from flexing in the other direction by projection 148. Spring 150 is of such length and so positioned as to engage lever 118 and free the projection 120 thereof from detent 68.

Figure 6:
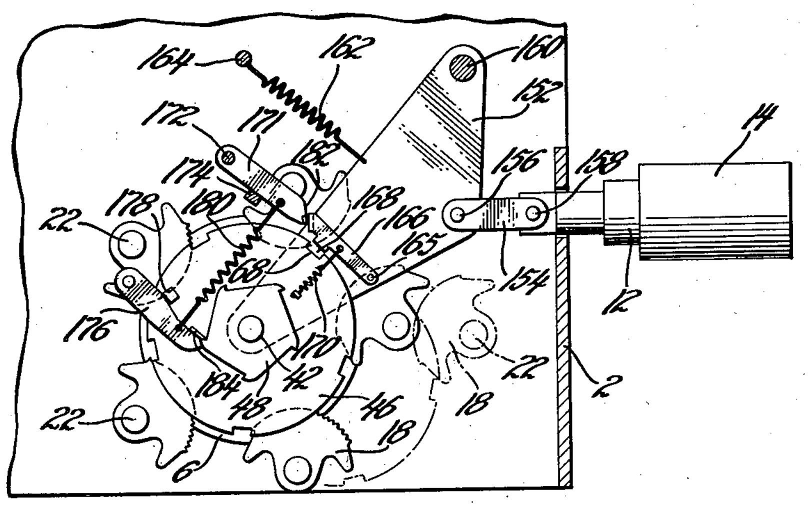
Figure 6 shows a third embodiment of our invention.

Referring to the embodiment of our invention shown in Figure 6, the turret assembly in this construction is carried in an oscillatory orbit by plate 152. This plate is attached to the actuating solenoid by a small link 154 secured at one end to the plate by pin 156 and at the other end by pin 158 to the solenoid core 12. The plate is rotatably attached to the frame 2 by a pin 160. Tension spring 162 attached to the frame 2 by pin 164 biases the plate in a clockwise direction. Plate 152 carries rotatably mounted on one end thereof, by means of pin 42, the turret tuning assembly shown in Figure 4. Latching lever 166 is rotatably mounted on plate 152 by pin 165 in such a manner as to allow projection 168 to engage detents 68 of the index plate 46. A tension spring 170 attached both to latching lever 166 and plate 152 biases the projections into engagement with the detents 68. Cam lever 171 is rotatably mounted to the frame 2 by pin 172. Projection 174 on frame 2 permits only limited clockwise rotation of this lever. Lever 171 is biased against this projection, and indexing lever 176, also rotatably attached to the frame, is similarly biased but in a counterclockwise direction against a similar frame projection 178, by a spring 180 attached between these two levers. Lever 171 has a cam surface 182 which engages a similar cam surface on lever 166 to disengage projection 168 from detent 68 at the proper time. The projection or dog 184 on lever 176 is so positioned as to engage the index cam 48 and properly index the turret plate.

Figure 7:
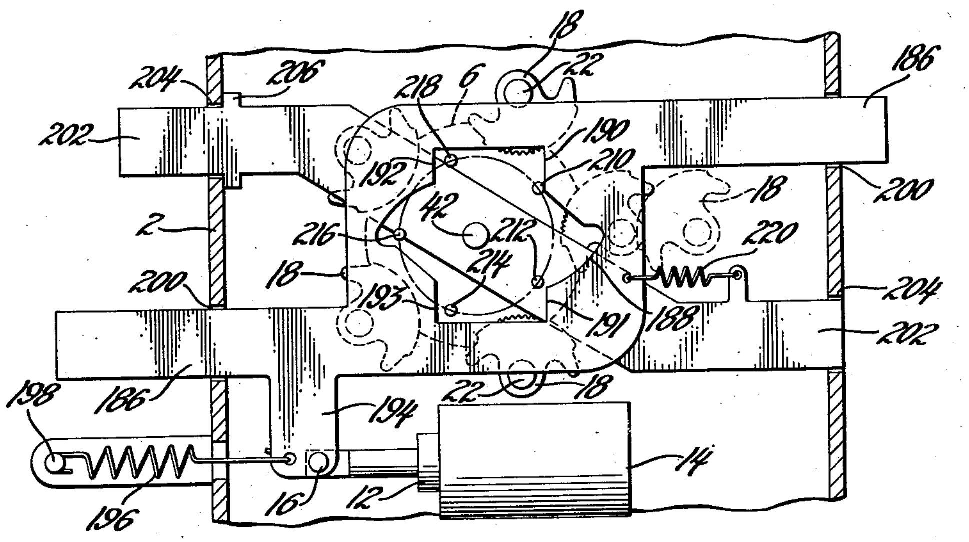
Figure 7 shows a fourth embodiment of our invention.

Referring to Figure 7, another embodiment of our invention using a double slide cam arrangement is shown. In this figure, the frame of the radio 2, supports cam slide 186 in guides 200. Cut in this slide is an opening 188 which carries therein two pairs of cam surfaces 190, 191, 192 and 193, so positioned as to properly engage indexing pins on the turret 6. These cam surfaces may be replaced by any pin engaging means without departing from the scope of the invention. A projection 194 on the slide 186 has attached thereto a solenoid core 12 for actuating the slide on the tuning stroke. The slide is biased in the direction of the retracting stroke by a tension spring 196 secured at one end to the base 2 by means of a pin 198.

A second slide 202 is carried in the frame 2 by guides 204. This slide has projection 206 to limit its movement in one direction and the treadle bar limits its movement in the other. This second slide has rotatably mounted thereon by means of pin 42, a turret quite similar to that more specifically shown in Figure 4 and described above. The turret used in the modification of this invention shown in Figure 7, however, has the index cam 48 replaced by equally spaced index pins 210, 212, 214, 216 and 218 arranged concentric with the axis of rotation of the turret. Slide 202 is resiliently connected to slide 186 by means of tension spring 220.

The operation of the invention is as follows:

Referring to Figures 1, 2 and 3, Figure 2 shows one embodiment of this invention in the position assumed when the radio set is tuned. When it is desired to tune the set to the next stage in sequence the solenoid 14 is deenergized by breaking the power circuit, not shown. The slide 4 then moves to the left under the action of spring 17. Lever 66 slides under lever 92 as the assembly proceeds to the left. Near the end of the retracting stroke, the pin 60 on the slide 4 engages the bellcrank lever 84, as shown in Figure 1, tripping the dog on this lever out of the notch 82. This action releases the ratchet slide 72 and it moves to the right under the action of spring 76. The ratchet pawl 78 then engages a notch on the index cam 48 which tends to rotate the turret assembly in the counterclockwise direction. Simultaneously, or immediately before, lever 92 engages latching lever 66 forcing the projection on this latching lever out of the detent 68 of the index plate 46 allowing the turret to rotate. On further movement of the ratchet slide 72, the lever 92 disenages the latching lever 66 allowing the projection on this lever to engage the next detent 68 and so stop the rotation of the turret plate. The turret is now fully indexed as shown in Figure 3 and in a position to tune the set to the next preselected frequency. The solenoid 14 is now reenergized and the slide 4 proceeds to the right on the tuning stroke. As this slide moves to the right the toe of the lever 56 engages projection 80 of the ratchet slide 72 recocking the indexing mechanism.

Referring again to Figure 2, the double contact tuning cam 18 engages the treadle bar 40 which in turn moves the core 8 into the correct position in the coil 10 to tune the set. As this operation is repeated, the radio set is tuned to five preselected stages in sequence.

Referring to Figure 4, the preselection of the frequencies to be received may be made by adjusting the position of the cam 18 while it is in contact with the treadle bar 40. When this cam is in a position to tune the set, the teeth of the gear 32 are aligned with the teeth of the adjusting spur gear 34 to tune the set and thereby select the frequency to be received, the shaft 36 is retracted against the bias of the spring 38 sufficiently to cause engagement of the teeth of the gears 32 and 34. Movement of the shaft 36 is thereby transmitted through these gear teeth and through the worms 26 so as to adjust the cams and consequently the tuning elements to the frequency desired.

Figure 5 shows another modification of the invention, this modification being shown with the tuning slide in a partly retracted position. In this modification, when the solenoid 14 is deenergized, the slide 106 is retracted from the tuned position by action of the spring 108. As it is retracted the projection 142 on the ratchet lever 136 engages the index cam 48, and is carried back from its position against projection 144, so as to exert a rotational force in a counterclockwise direction on the turret assembly. Near the end of the retracting stroke, the latching lever 118 engages the leaf spring 150 forcing the projection 120 out of the detent 68. This allows the turret to rotate until the projection 130, which is now riding against the index plate 46, engages a second detent 68, thereby stopping rotation. When the solenoid 14 is energized, the slide 106 moves to the right on the tuning stroke. As it proceeds to the right, the lever 122 engages the projection or stop 132 thereby disengaging the lever from the detent 68, allowing the turret to further rotate until the projection 120 on the lever 118 engages another detent 68. The turret is then fully indexed. As the tuning stroke is further continued, the double contact cam 18 is brought in contact with the treadle bar 40 which, in turn, positions the tuning elements of the radio set, thus tuning the set to the next preselected frequency.

Referring to Figure 6, another modification of our invention is shown with the tuning mechanism in a partly retracted position. In this modification, when the solenoid 14 is deenergized, the plate 152 rotates clockwise around pin 150 under the force of spring 162. The cam surface 182 on the cam lever 171 engages the latching lever 166 raising the projection 168 out of the detent 68. Almost simultaneously the dog 184 on the lever 176 engages the index cam 48 rotating it counterclockwise. As the retracting stroke proceeds, the latching lever 166 rides over the cam 182 dropping the projection 168 down into contact with the index plate 46. The turret continues to rotate until this latching projection drops into the next detent 68 completing the indexing function. When the solenoid is energized, the plate 152 rotates in a counterclockwise direction bringing the indexed cam 18 into contact with the treadle bar 40 so as to tune the set to the next preselected stage. As the tuning stroke proceeds, the dog 184 rides over the index cam 48 and the lever 176 assumes the position against the stop or frame projection 178 and is thus in position for the next indexing stroke. Also, as the tuning stroke proceeds, the end of lever 171 will be displaced in a counterclockwise direction against the bias of spring 180 due to the action of cam tip of lever 166, thus allowing projection 168 to remain in contact with index plate 46. The treadle bar 40 in this modification tunes the set by indexing the tuning members in the same manner as described above.

Figure 8:
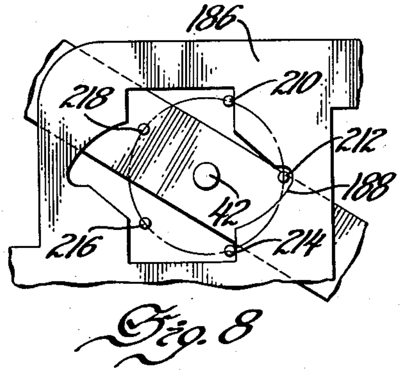
Figure 8 shows certain details of turret indexing mechanism of the embodiment of our invention shown more fully in Figure 7.
Figure 9:
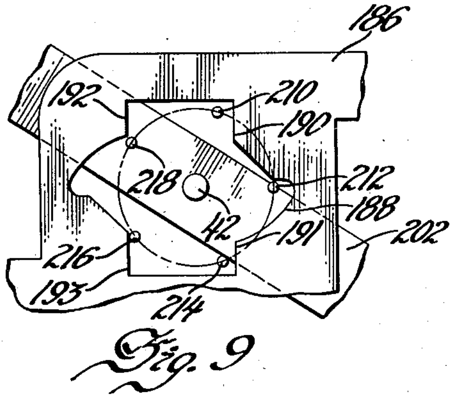
Figure 9 shows the same construction as Figure 8 with the turret in the partly indexed position.
Figure 10:
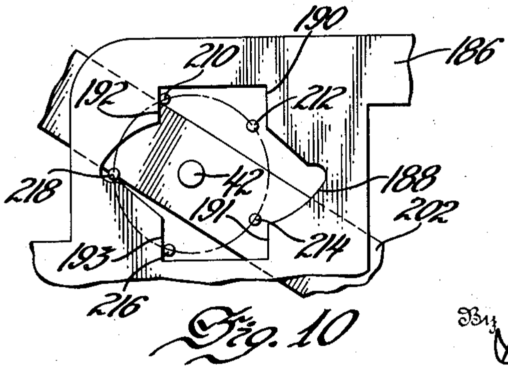
Figure 10 shows the same construction as Figures 8 and 9 with the tuning turret in the completely indexed position.

Referring to Figures 7, 8, 9 and 10, another modification of the invention using a double slide cam arrangement is illustrated. In Figure 7, this mechanism is shown just after the start of the indexing motion. When it is desired to tune the set to the next preselected frequency in sequence, the solenoid 14 is deenergized and the slide 186 proceeds to the left under the action of spring 196. As it does so, the slide 202 follows under action of spring 220 until projection 206 engages the frame 2, then the camming surface 190 of slide 186 engages the pin 210 on the rotating turret, rotating said turret in a counterclockwise direction until the pin 214 engages the camming surface 191. The turret is then one-half indexed and in the fully retracted position, as shown in Figure 8. The solenoid 14 is then again energized, the cam surface 193 engages the pin 216, as shown in Figure 9, rotating the turret until pin 210 engages camming surface 192 as shown in Figure 10. The turret and slide 202 is then carried along with slide 186 on the tuning stroke until the positioned cam engages the treadle bar 40, thereby positioning the tuning elements of the set to the next preselected frequency.

From the description above, it may thus be seen that a succession of forces introduced either manually or electrically on the same element of a radio set, may be used to tune the set to several preselected frequencies in sequence. Although the invention is specifically described for inductive or permeability tuning, it may be readily appreciated that the invention equally applies to capacitive tuning. A gang condenser could be driven by shaft 100 and the present invention would be equally applicable to such a tuning mechanism. It is also equally obvious that the slides in the various modifications of our invention could be actuated manually as well as electrically.

It is to be understood also that although the invention has been described with specific reference to a particular embodiment thereof, it is not to be so limited since changes and alterations therein may be made which are within the full intended scope of this invention as defined by the appended claims.

We claim:

1. A sequential positioning device including: a rotatable treadle bar to be positioned, a turret carrying equally spaced adjustable double contact cams capable of contacting said treadle bar at two points on opposite sides of its axis of rotation and so position said treadle bar, means for actuating said turret to cause said cams to contact said treadle bar, said turret and said cams rotatable about axes parallel to the axis of rotation of said treadle bar means for indexing said arcuate cams into position for contacting said treadle bar and means for adjusting said arcuate cams when they are in contact with said treadle bar.

2. A radio tuning device including: a tuning reactance element, a rotatable treadle bar for positioning said reactance element, a plurality of adjustable double contact cams each capable of forcing said treadle bar into a preselected position, said cams and said treadle bar rotatable about parallel axes and a single means for actuating said cams in sequence to thereby cause engagement of one of said cams with said treadle bar to actuate said treadle bar, and simultaneous acting indexing mechanisms, all so positioned that said radio may be tuned to several preselected frequencies in sequence.

3. A sequential turret type radio tuning device including a treadle bar for positioning the tuning element, a plurality of adjustable cams equidistantly spaced on a turret, each capable of moving the treadle bar to a preselected position, a reciprocating plate carrying said turret rotatably mounted thereon, a ratchet plate rigidly secured to said turret, a reciprocating slide carrying a pawl, means for causing reciprocation of the slide actuated by the reciprocating plate said pawl engaging said ratchet plate and indexing said turret upon the movement of said reciprocating plate.

4. An indexing device for turret type sequential tuners including, a reciprocating plate to which is rotatably secured a tuning turret having a plurality of equidistantly spaced adjustable tuning cams secured thereon, said turret having rigidly secured thereto an index plate having detents therein and a ratchet plate, a pawl capable of engaging a detent in said index plate, a reciprocating spring biased indexing slide, means actuated by said slide to move the pawl means for cocking said slide on movement of said reciprocating plate in one direction, means on movement of said reciprocating plate in the other direction for tripping said indexing slide to allow the slide to engage said ratchet plate and to disengage said pawl from said detent, so as to index said turret to a predetermined position and lock said turret in this position.

5. An indexing device for turret type sequential tuners including, a reciprocating slide to which is rotatably secured a tuning turret having a plurality of equidistantly spaced adjustable tuning cams secured thereon, said turret having rigidly secured thereto an index plate having a plurality of detents equidistantly spaced thereon, said turret also having rigidly secured thereto a ratchet plate, a spring biased reciprocating indexing slide capable of engaging said ratchet plate and indexing said turret, an oscillating lever with a pawl for engaging a detent in said index plate when said turret is fully indexed, means actuated by the indexing slide to move the oscillating lever means associated with said first mentioned slide to cock said ratchet slide on one stroke, and a second means for tripping said ratchet slide on the reverse stroke of said first mentioned slide so that the turret is indexed.

6. A sequential turret type radio tuning device including a treadle bar for positioning the tuning elements, a tuning turret carrying a plurality of adjustable cams thereon, a ratchet plate rigidly secured to said turret, a reciprocating plate carrying said turret rotatably mounted thereon, an oscillating lever carrying a second lever rotatably mounted thereon, said second lever carrying a pawl rigidly attached thereto, said pawl engaging said ratchet plate and indexing said turret thereby positioning one of said adjustable cams relative to said treadle bar upon the movement of said reciprocating plate in each of two directions.

7. An indexing mechanism for sequential turret type radio tuners, including: an oscillatable plate carrying a turret with a plurality of tuning cams rotatably mounted thereon, said turret having rigidly attached thereto a ratchet wheel and an index plate, a lever for engaging said index plate and locking it from rotation, said lever rotatably mounted to said oscillatable lever, a pawl engaging said ratchet wheel, and a cam actuating said lever to disengage it from the index plate upon the movement of said turret carrying oscillatable plate and means for oscillating said plate to cause the sequential indexing of said indexed plate.

8. A sequential turret type radio tuning device including: a treadle bar for positioning the tuning element, a plurality of cams equidistantly spaced on a turret, means for actuating said turret to cause one of said cams to engage said treadle bar and thereby index said treadle bar to a preselected position, an oscillating plate carrying said turret rotatably mounted thereon, means for locking said turret in a fixed position on said plate, means actuated by movement of said oscillating plate with respect thereto to unlock said turret, index it to a new position and lock it in the indexed position.

9. An indexing mechanism for sequential turret type radio tuners, including a slide carrying a turret tuner rotatably mounted thereon, said turret tuner having a plurality of projections thereon, a second slide mounted for relative motion with respect to the first and having cam surfaces so positioned and associated with said projections as to cause said turret to be indexed the distance between two projections when said second slide is moved once with respect thereto in each of two directions and means for causing such relative motion.

10. An indexing mechanism for sequential type turret radio tuners including, a reciprocating member carrying a rotatable turret with a plurality of tuning cams equidistantly spaced on said turret, said turret also having a plurality of projections equidistantly spaced thereon, a second reciprocating member mounted for relative motion with respect to the first and having cam surfaces, said surfaces so positioned and arranged as to engage at least two of said projections to index said turret on the completion of two strokes of relative motion of said second reciprocating member with respect to the first and means for causing such relative motion.

11. An indexing mechanism including: a plate capable of oscillatory movement, means for imparting said oscillatory movement to said plate, a cam-carrying turret rotatably mounted on said plate, rotatably adjustable double contact cams mounted on said turret at a common radial distance and equiangularly displaced from each other, a rotatable treadle bar so located as to permit the simultaneous contact on both sides of its axis of rotation by one of said cams, means for rotatably indexing said turret the necessary angular distance to sequentially place said cams into position for engaging said treadle bar.

12. An indexing mechanism as claimed in claim 11 in which the plate, the turret, the cams, and the treadle bar all have parallel axes of rotation.

13. An indexing mechanism as claimed in claim 11 including means for adjusting the cams while they are engaged with the treadle bar.

14. An indexing mechanism as claimed in claim 11 in which the means for rotatably indexing the turret includes an index plate and a ratchet wheel concentrically located on said turret, a lever rotatably mounted on said oscillating plate for engaging said index plate and locking it from rotation, a pawl engaging said ratchet wheel, and a cam actuating said lever to disengage it from said index plate upon the movement of said turret-carrying plate which is capable of oscillatory movement.

15. An indexing mechanism for sequential turret type radio tuners as claimed in claim 7 in which the plate capable of oscillatory movement, the turret, the tuning cams, the ratchet wheel, the index plate and the indexing lever all have parallel axes of rotation.

CARL W. BLOSSEY.
MANFRED G. WRIGHT.

REFERENCES CITED

The following references are of record in the file of this patent:

UNITED STATES PATENTS

| Number | Name | Date |
|---|---|---|
| 2,310,720 | Wandrey et al. | Feb. 9, 1943 |
| 2,342,691 | Plensler | Feb. 29, 1944 |
| 2,342,851 | Fichter et al. | Feb. 29, 1944 |
| 2,411,754 | Pifer et al. | Nov. 26, 1946 |